(12) United States Patent
Madelaine

(10) Patent No.: US 8,891,437 B2
(45) Date of Patent: Nov. 18, 2014

(54) METHOD FOR PROCESSING A FREQUENCY BAND BY A WIRELESS COMMUNICATION DEVICE AND CORRESPONDING DEVICE

(75) Inventor: Sebastien Madelaine, Luisant (FR)

(73) Assignee: ST-Ericsson (France) SAS, Grenoble (FR)

( * ) Notice: Subject to any disclaimer, the term of this patent is extended or adjusted under 35 U.S.C. 154(b) by 364 days.

(21) Appl. No.: 13/264,413

(22) PCT Filed: Apr. 14, 2010

(86) PCT No.: PCT/EP2010/054860
§ 371 (c)(1),
(2), (4) Date: Dec. 21, 2011

(87) PCT Pub. No.: WO2010/119048
PCT Pub. Date: Oct. 21, 2010

(65) Prior Publication Data
US 2012/0094609 A1    Apr. 19, 2012

(30) Foreign Application Priority Data
Apr. 15, 2009   (FR) ..................................... 09 52465

(51) Int. Cl.
*H04B 7/212* (2006.01)
*H04W 56/00* (2009.01)

(52) U.S. Cl.
CPC ................................ *H04W 56/0035* (2013.01)
USPC ......................................... 370/324; 370/503

(58) Field of Classification Search
CPC ..................................................... H04W 56/00
USPC .......................................... 370/241, 324, 503
See application file for complete search history.

(56) References Cited

FOREIGN PATENT DOCUMENTS

| | | |
|---|---|---|
| EP | 1422962 A1 | 5/2004 |
| EP | 2040502 A1 | 3/2009 |
| GB | 2409610 A | 6/2005 |
| WO | 0141494 | 7/2001 |
| WO | 2007022429 | 2/2007 |

OTHER PUBLICATIONS

Telecommunications Industry Associatoin, "TDMA Third Generation Wireless Digital Control Channel Layer 3", TIA/EIA,136-123-F (Revision of TIA/EIA-136-123-E), AIA/TIA Standards, Aug. 1, 2006, XP017005656, Chapters 4.1.2.6-7, 4.1.2.9, 4,1.6.3-4, 4.1.6.6-4.1,6.6.2, Telecommunications Industry Associations, Arlington, VA, US.

*Primary Examiner* — Sai-Ming Chan
(74) *Attorney, Agent, or Firm* — Coats & Bennett, P.L.L.C.

(57) ABSTRACT

A method and apparatus for processing a frequency band by a wireless communication device to locate communication channels comprises detecting potential communication channels of the band; selecting of a sample of these detected potential channels; performing a synchronization test on the channels of the sample; and rejecting the frequency band if all of the synchronization tests fail. The frequency band may be subdivided into a plurality of ranges and a sample of detected potential channels selected for each range. The strongest detected potential channels may be selected for the sample for each range.

5 Claims, 5 Drawing Sheets

METHOD FOR PROCESSING A FREQUENCY BAND BY A WIRELESS COMMUNICATION DEVICE AND CORRESPONDING DEVICE

FIELD OF THE INVENTION

The present invention relates to the field of wireless communications and more particularly to searching for or searching for and selecting a cell within a wireless communication device.

The invention applies advantageously but not limitingly to the communication systems governed by the GSM, UMTS or LTE standards according to the acronyms well known to those skilled in the art.

BACKGROUND

When switched on, a wireless communication device searches all the frequency bands to find available cells. For example, a quad-band telephone will search in the GSM900, DCS1800, PCS1900 and GSM850 bands in case a signal, whether useful or not, is present therein. This search on each of the four bands may take time. This time is often wasted because they are not all used. Specifically, although in certain countries the telecommunication service providers use all these bands, only two bands out of the four are used in most countries. For example a quad-band telephone used in Europe will waste time searching for a cell in the American PCS1900 and GSM850 bands. Moreover, if certain bands contain only noise, the latter will first of all be associated with one or more potential channels then leading to a search for cells on these channels which will be unsuccessful in the end; the result of this is again a waste of time.

Solutions for excluding certain bands are proposed on the basis of the geographic location of the telephone, via, for example, service provider codes (MNC: Mobile Network Code, according to the terms well known to those skilled in the art). This is not reliable because in each of these countries the use of these bands may change. Other solutions are proposed on the basis of the frequency that the mobile had previously selected. This is not reliable either, because there are geographic zones in which the European and American bands coexist.

SUMMARY

The search for cells on a band actually involves several steps. Amongst them, there is that of detecting the various potential channels and then that of synchronization which comprises in particular the obtaining of the information from the cells such as, for example, the cell identifier. This second step (synchronization), carried out on each of the channels of the band, takes much more time than the first step (detecting the potential channels).

According to one embodiment, it is proposed to enhance the conditions for carrying out this second step. Specifically, although in the prior art this step is carried out on all the channels of a frequency band provided that a signal is present therein, the proposal is to carry out this second step only after a positive synchronization test on a sample of channels. This makes it possible to obtain a cell search acceleration that is lasting and identical worldwide, while not wasting time unnecessarily trying to synchronize on bands that contain only noise.

According to one aspect, a method for processing a frequency band likely to contain communication channels is proposed, comprising a detection of the potential communication channels of the said band.

According to this aspect, the method also comprises a selection of a sample of these detected potential channels, a synchronization test on the channels of the said sample and a rejection of the frequency band if all the synchronization tests have failed.

In this way a frequency band that is for example noisy in which no cell is present is rapidly excluded.

The sample may be selected at random or not or else in an arbitrary manner or in any other way. In case of a random selection, this selection can be done among the channels whose power is over a threshold (for example—108 dBm).

This being so, the use of a random or arbitrarily selected sample on which all the synchronization tests are carried out may represent a risk of excluding a frequency band while at least one cell, not selected in the sample, is available. One of the risks may be in particular, in the case of a band that is corrupted in certain portions, a selection of all the channels of the sample in a portion of the frequency band that is corrupted.

Thus, according to one embodiment, the selection step advantageously comprises a subdivision of the frequency band into several ranges and a selection of a single channel present in each range.

With this embodiment, it is therefore proposed to target several ranges and to test only one channel per range after the band has been subdivided. The risk of selecting all the samples within a corrupted portion is therefore limited. The selection of one channel within each range can be, for example, done randomly among the channel whose power is over a threshold (for example—108 dBm).

According to another embodiment, during the selection step, the selected channel in each range is the one whose power is the highest.

Therefore, the risk within each of the ranges of selecting a channel that is corrupted is further reduced, the most powerful channel being a priori the least likely to be noise. Therefore, if a range contains an available cell, the risk of not detecting it is reduced. Therefore the risk of excluding the band while at least one range contains an available cell is reduced.

Subsequently, a synchronization test is also advantageously carried out on all the detected potential channels of the band if at least one of the synchronization tests carried out on the said sample has succeeded.

The necessary test on all of the detected channels of the band is therefore carried out but never unnecessarily.

According to another aspect, a wireless communication device is proposed comprising means for processing a frequency band comprising means for detecting potential communication channels of the said band.

According to this aspect, the processing means also comprise means for selecting a sample of channels from the detected channels, test means capable of carrying out a synchronization test on a channel and control means capable of activating the test means on the channels of the sample and of delivering an indication of rejection of the said band if the tests on all the channels of the sample have failed.

According to one embodiment, the selection means comprise means for subdividing the frequency band into several ranges and the said means for selecting the sample are capable of selecting a single channel present within each range.

According to another embodiment, the processing means comprise means for determining the power of the channels and storage means capable of storing the power of the channels on each of the ranges, and the selection means are capable of selecting in each range the channel having the highest power.

According to another embodiment, the control means are capable of activating the test means in order to test all the channels of the band if at least one of the synchronization tests on the channels of the sample has succeeded.

The device is for example a cellular mobile telephone.

BRIEF DESCRIPTION OF THE DRAWINGS

Other advantages and features of the invention will appear on studying the detailed description of methods of application and embodiments, taken as non-limiting examples and illustrated by the appended drawings in which.

DETAILED DESCRIPTION

Figure 1:
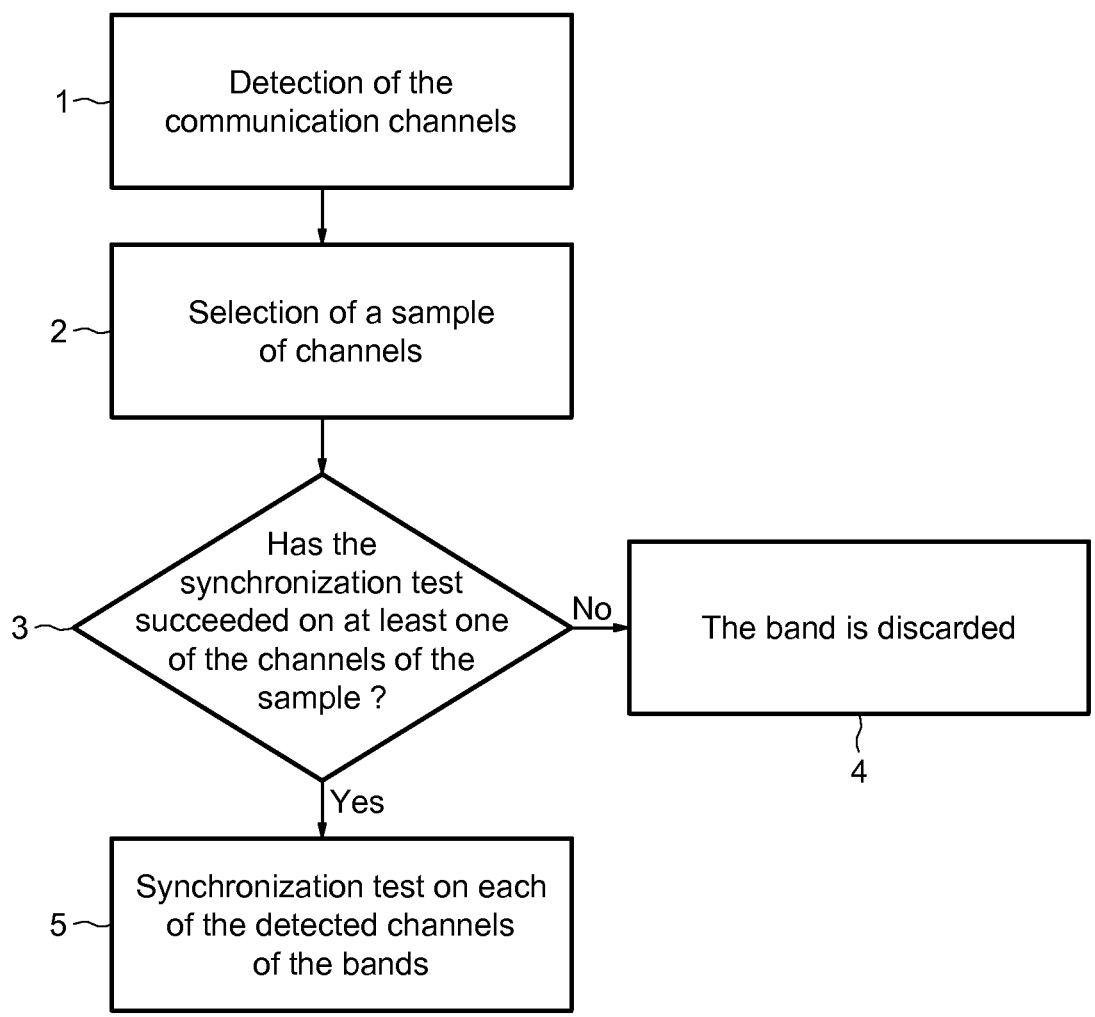
FIG. 1 illustrates an example of a flowchart for processing a frequency band.

FIG. 1 shows a method of application of a method according to the invention. In a first step (step 1), a detection of all the potential communication channels of a frequency band is carried out. This detection is conventional and known per se and can be carried out for example based on the measured power, for example in dBm. Then (step 2) a sample of channels is selected in the frequency band. Examples of a selection process are set out in FIGS. 3, 4, 5.

A synchronization test is then carried out on the sample (step 3). Such a test is well known to those skilled in the art and comprises in particular the retrieval of information on the cell, such as its identifier (BSIC: Base Station Identity Code according to the terms well known to those skilled in the art) and the service provider information (MCC, Mobile Country Code, via the "System Information" according to the terms well known to those skilled in the art). If synchronization is impossible on all the selected channels, the band is discarded (step 4) and the cell that will be finally chosen will not belong to this band. Otherwise, the synchronization test is carried out on all of the channels of the frequency band (step 5) and the process of searching and/or selecting a cell well known to those skilled in the art continues while taking account of this frequency band.

Figure 2:
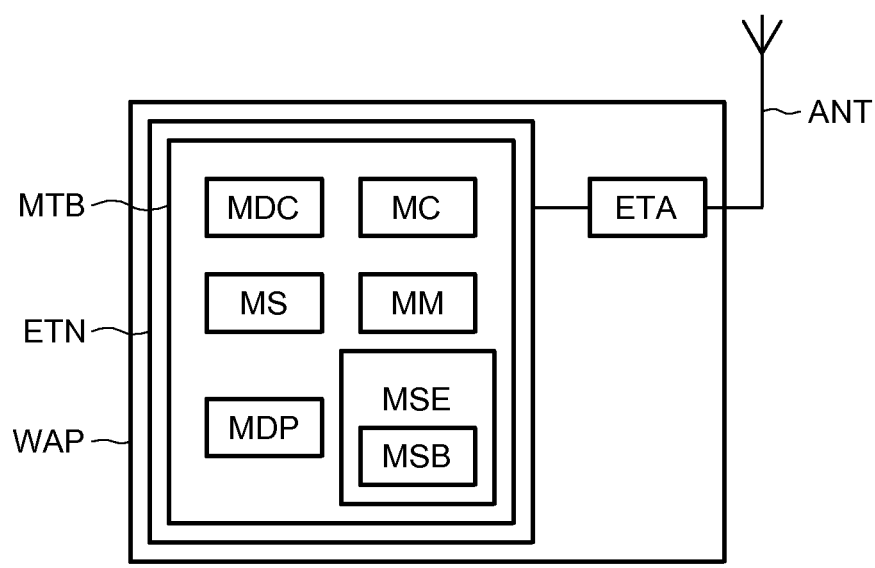
FIG. 2 illustrates an embodiment of a wireless communication device according to the invention.

FIG. 2 illustrates an embodiment of a wireless communication device according to the invention. The wireless communication device referenced WAP comprises, in a conventional manner, an analogue processing stage ETA, an antenna ANT and a baseband digital stage ETN. The analogue processing stage and the antenna allow the transmission and reception of the radio frequency signals. The digital processing stage, comprising for example a microprocessor, comprises means MTB for processing a frequency band.

These means MTB comprise means MDC for detecting the potential channels within the frequency band, means MSE for selecting a sample from the detected potential channels on the band, means MS for testing the synchronization on the channel and control means MC. The control means MC are capable of activating the test means MS and of delivering an indication of rejection of the frequency band if necessary.

The means MTB for processing a frequency band also comprise means MDP for determining the power of a channel and means MM for storing the powers of the channels in each range. The means MSE for selecting a sample comprise means MSB for subdividing the band into several ranges. The means MSE interact with the means MM, MDP and MDC to select a sample.

The means MTB, MDC, MS, MDP, MC, MM, MSE and MSB can be wholly or partly embodied by logic circuits and/or software modules incorporated for example within the baseband processor of the wireless communication device.

Figure 3:
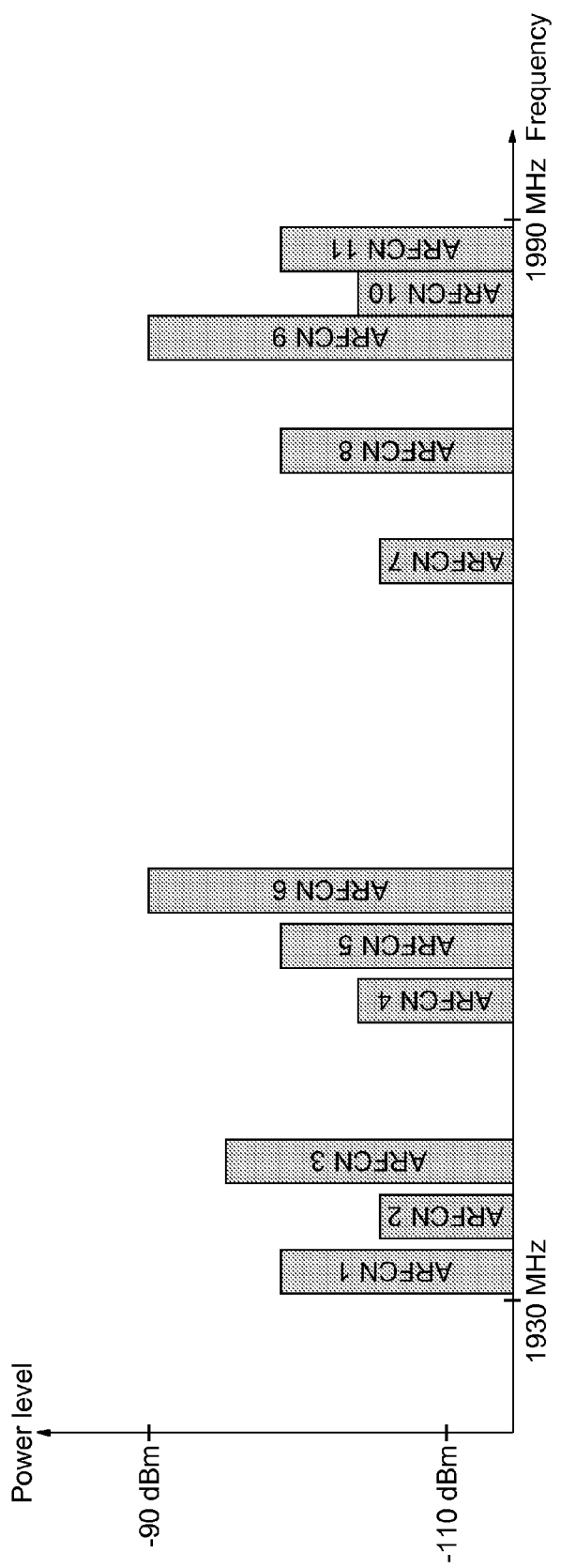
FIGS. 3, 4, 5 illustrate examples of a process of selecting a sample of channels in the PCS1900 band.
Figure 4:
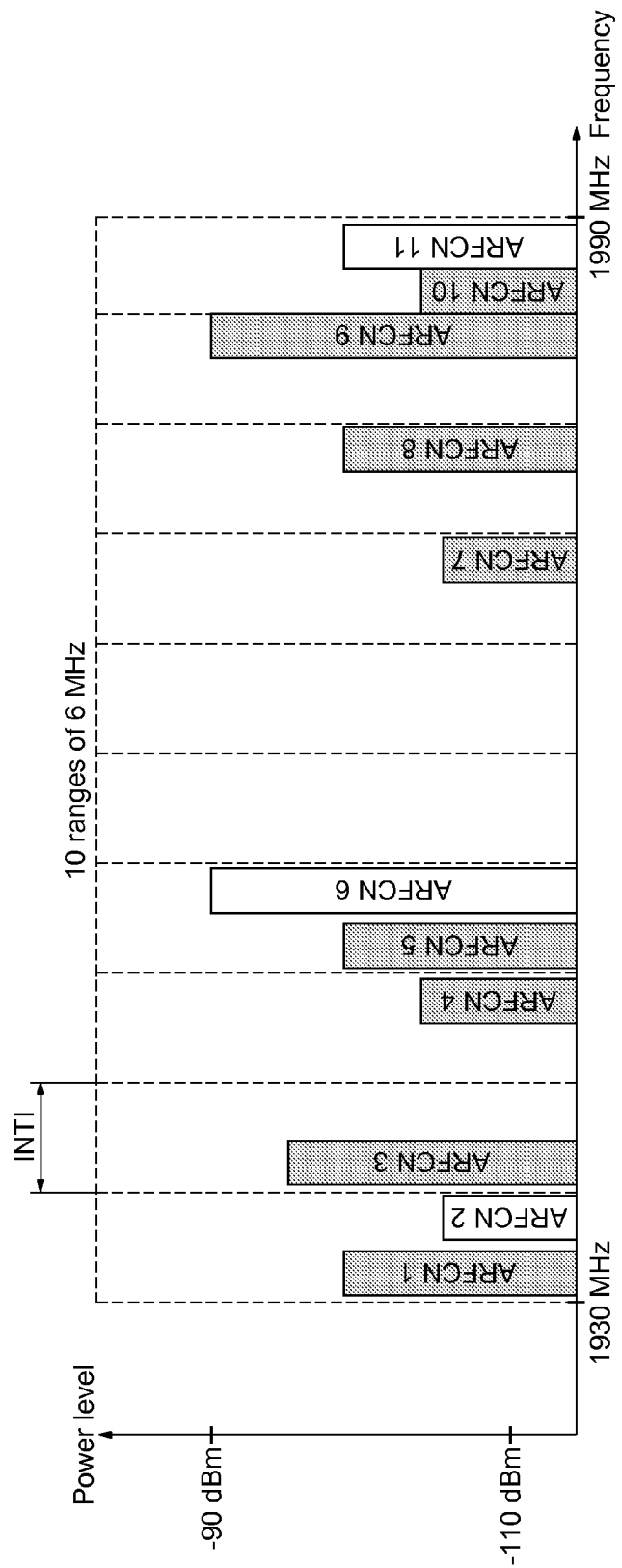
Figure 5:
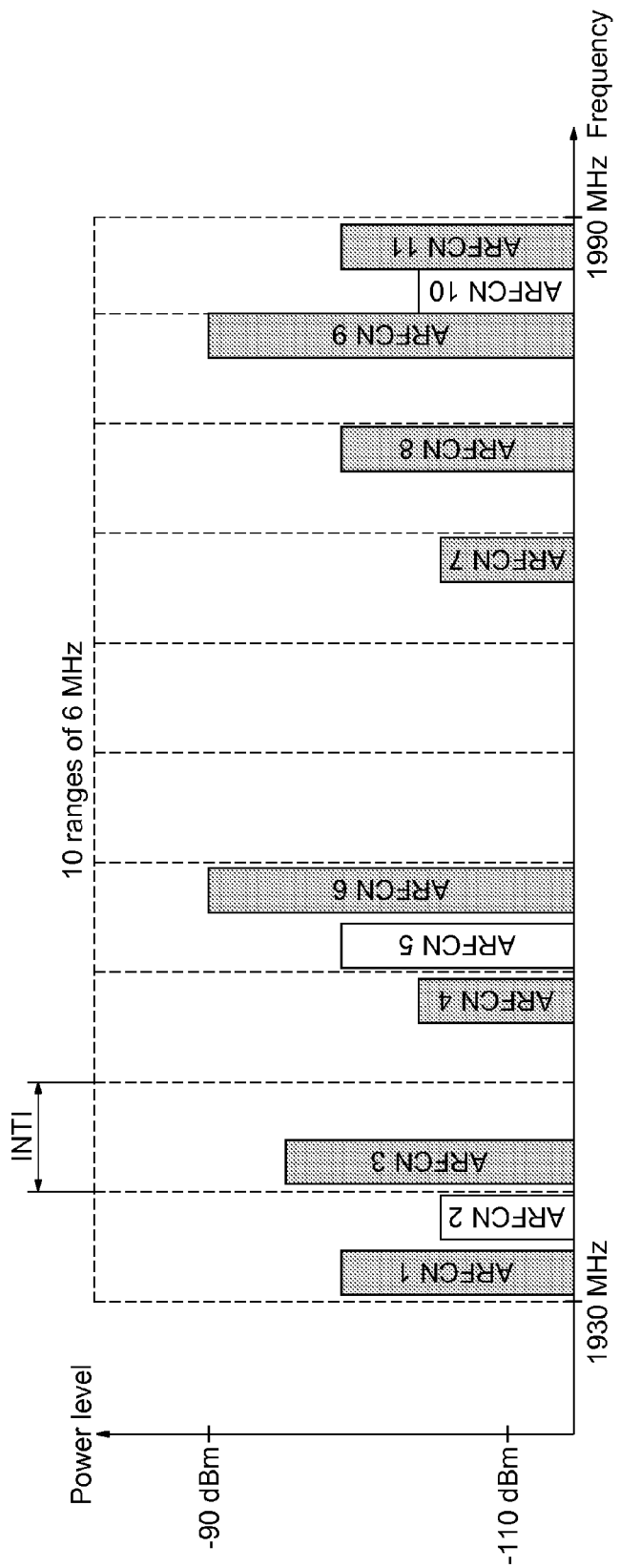

FIGS. 3, 4, 5 illustrate several variants for selecting the sample of the channels chosen for example within the PCS1900 band (1930-1990 MHz). In a first variant illustrated in FIG. 3, a certain number (for example 11) of channels ARFCNi are selected for example in a random manner from the detected channels. A first sample is obtained in this way. As it can be seen from FIG. 3, the sample of channels can be selected randomly among the channel whose power is higher than a threshold (for example—108 dBm).

The use of such a random or arbitrary sample represents a risk. Specifically, it is possible that the latter contains none of the uncorrupted channels present in the frequency band.

This risk is nevertheless controlled, for example if the extraction process follows a binomial law defined by:

$$p(k)=n!/(k!\cdot(n-k)!)\cdot(p)^{k}\cdot(q)^{n-k}$$

in which:
n=number of channels in the sample;
k=number of uncorrupted channels selected;
p=proportions of the uncorrupted channels; and
q=proportion of the corrupted channels.

Specifically, the probability of selecting only corrupted channels (or no correct channels, k=0) from a sample containing 10 elements and with a distribution of the corrupted channels of 1 out of 2 in the frequency band in question is then:

$$p(k=0 \text{ correct channels})=0.09\%,$$

which is quite a low value.

In another variant (FIG. 4) it is possible to subdivide the band for example into several ranges INTi of a certain spectral width so as to occupy the whole of the frequency band. Preferably the ranges may be chosen so as to have the same spectral width. The choice of this width represents a compromise between too narrow a width which would induce a considerable processing time with a channel and a synchronization test in a portion of these ranges and too great a width with which an uncorrupted channel might not be detected. In a preferred embodiment, a number of ranges equal to 10 and a range of 6 MHz are chosen. Therefore, in this embodiment, after the band has been subdivided (FIG. 4), a channel is selected from each range. The selection of a channel from the channels of the range is carried out for example in a random manner and advantageously in a random manner among the channels of the range whose power is higher than a threshold (for example—108 dBm). This gives, for example, a second sample of channels illustrated by the greyed channels in FIG. 4.

In a final variant, after the band has been subdivided for example into 10 ranges of 6 MHz, a channel is selected from each range. Within each range, the most powerful channel is selected. Therefore, the risk within each of the ranges of selecting a channel that is corrupted is reduced, the most powerful channel being a priori less likely to be noise.

All of the channels thus selected (the greyed channels in FIG. 5) form a third sample.

The invention claimed is:
1. A method of processing a frequency band likely to contain communication channels, comprising:

detecting potential communication channels in the frequency band;

subdividing the frequency band into a plurality of ranges;

selecting a sample of the detected potential communication channels by selecting a single channel in each range;

performing synchronization tests on the channels in the sample by performing synchronization tests on all the detected potential channels in the frequency band if at least one of the synchronization tests carried out on the sample succeeds; and rejecting the frequency band if all of the synchronization tests fail.

2. The method of claim 1 wherein the channel selected in each range is the channel having the highest power.

3. A wireless communication device, comprising:

a processor configured to execute a processing function to process a frequency band, the processing function comprising a detector function configured to detect potential communication channels (MDC) of the frequency band;

a selector function configured to subdivide the frequency band into a plurality of ranges;

the selector function further configured to select a sample of channels from the detected potential communication channels by selecting a single channel present within each range;

a test function configured to perform a synchronization test on a channel; and a control function configured to activate the test function on the channels of the sample, further configured to activate the test function to test all the channels of the band if at least one of the synchronization tests on the channels of the sample succeeds, and further configured to reject the frequency band if the tests on all the channels of the sample fail.

4. The device according to claim 3, further comprising memory configured to store a power of the channels in each of the ranges; and wherein the processing function is further configured, to determine the power of the channels in each of the ranges; and wherein the selector function is configured to select in each range the channel having the highest power.

5. The device of claim 3 wherein the wireless communication device comprises a cellular mobile telephone.

* * * * *